US012662263B2

(12) United States Patent
Lee

(10) Patent No.: US 12,662,263 B2
(45) Date of Patent: Jun. 23, 2026

(54) DRONE HAVING MULTI-DEGREE-OF-FREEDOM FLIGHT MODE

(71) Applicant: Sang Hyun Lee, Nam-gu (KR)

(72) Inventor: Sang Hyun Lee, Nam-gu (KR)

( * ) Notice: Subject to any disclaimer, the term of this patent is extended or adjusted under 35 U.S.C. 154(b) by 0 days.

(21) Appl. No.: 18/003,608

(22) PCT Filed: Nov. 25, 2020

(86) PCT No.: PCT/KR2020/016851
§ 371 (c)(1),
(2) Date: Dec. 28, 2022

(87) PCT Pub. No.: WO2022/004965
PCT Pub. Date: Jan. 6, 2022

(65) Prior Publication Data
US 2023/0234727 A1      Jul. 27, 2023

(30) Foreign Application Priority Data

Jun. 29, 2020      (KR) ........................ 10-2020-0079379

(51) Int. Cl.
*B64U 10/14*          (2023.01)
*B64C 27/52*          (2006.01)
(Continued)

(52) U.S. Cl.
CPC .............. *B64U 10/14* (2023.01); *B64C 27/52* (2013.01); *B64U 20/87* (2023.01); *B64U 30/29* (2023.01);
(Continued)

(58) Field of Classification Search
CPC .... B64U 10/14; B64U 50/13; B64U 2101/30; B64U 2201/00; B64C 27/52; G05D 1/0808
See application file for complete search history.

(56) References Cited

U.S. PATENT DOCUMENTS 6,719,244 B1 *    4/2004    Gress .................. B64C 29/0033
                                                                  244/7 R
10,351,234 B1      7/2019    Dennis
(Continued)

FOREIGN PATENT DOCUMENTS

CN          205113706 U      3/2016
CN          106494608 A      3/2017
(Continued)

OTHER PUBLICATIONS

KR-101883346-B1 Translation (Year: 2018).*
(Continued)

*Primary Examiner* — Kimberly S Berona
*Assistant Examiner* — Steven J Shur
(74) *Attorney, Agent, or Firm* — SECANT IP, LLC

(57)          ABSTRACT

Provided is a drone with a multiple DOF flight mode according to the present invention. The drone may include: a fuselage in which a battery is mounted and a forward direction is set in an x-axis; a plurality of rotors disposed around the fuselage in four or more, each rotational axis of which is aligned in a z-axis direction; an x-axis tilting mechanism unit formed to tilt the plurality of rotors about an axis parallel to the x-axis; a y-axis tilting mechanism unit formed to tilt the plurality of rotors about an axis parallel to the y-axis; a first drive motor unit driving the y-axis tilting mechanism unit; a second drive motor unit guiding the x-axis tilting mechanism unit; and a control unit configured to implement a plurality of flight modes by controlling the first rotor, the second rotor, the third rotor, the fourth rotor, the first drive motor unit, and the second drive motor unit.

8 Claims, 17 Drawing Sheets

(51) Int. Cl.

| | |
|---|---|
| *B64U 20/87* | (2023.01) |
| *B64U 30/29* | (2023.01) |
| *B64U 50/13* | (2023.01) |
| *G05D 1/00* | (2006.01) |
| *B64U 101/30* | (2023.01) |

(52) U.S. Cl.
CPC ........... *B64U 50/13* (2023.01); *G05D 1/0808* (2013.01); *B64U 2101/30* (2023.01); *B64U 2201/00* (2023.01)

(56) References Cited

U.S. PATENT DOCUMENTS

| | | | |
|---|---|---|---|
| 10,486,811 B1 | 11/2019 | Pounds | |
| 2016/0031554 A1 | 2/2016 | Eshkenazy et al. | |
| 2016/0347443 A1 | 12/2016 | Lee | |
| 2017/0015412 A1 | 1/2017 | Matus | |
| 2017/0283035 A1 | 10/2017 | Ji et al. | |
| 2017/0313410 A1* | 11/2017 | Ismagilov | .............. B64C 27/52 |
| 2023/0234728 A1 | 7/2023 | Lee | |
| 2023/0236610 A1 | 7/2023 | Lee | |

FOREIGN PATENT DOCUMENTS

| | | | | |
|---|---|---|---|---|
| CN | 110341951 A | 10/2019 | | |
| JP | 2006-051841 A | 2/2006 | | |
| JP | 2017-063960 A | 4/2017 | | |
| KR | 10-1692315 A | 12/2016 | | |
| KR | 2016-0148862 A | 12/2016 | | |
| KR | 2017-0061941 A | 6/2017 | | |
| KR | 101883346 B1 * | 7/2018 | ........... | B64C 39/024 |
| KR | 20180137633 A * | 12/2018 | | |
| WO | 2010/137016 A2 | 12/2010 | | |
| WO | 2019/198071 A1 | 10/2019 | | |
| WO | 2020/033140 A1 | 2/2020 | | |

OTHER PUBLICATIONS

KR-20180137633-A Translation (Year: 2018).*
International Search Report Corresponding to PCT/KR2020/016851 mailed Mar. 5, 2021.
Written Opinion Corresponding to PCT/KR2020/016851 mailed Mar. 5, 2021.
Korean Office Action Corresponding to KR 10-2020-0079379 mailed Jun. 15, 2021.
Lee et al., "System Modeling and Waypoint Guidance Law Designing for 6-DOF Quadrotor Unmanned Aerial Vehicle", International Journal of Aeronautical and Space Sciences, vol. 42(4), Apr. 2014, pp. 305-316 See International Search.
Cha et al., "A Study of Method and Algorithm for Stable Flight of Drone", Journal of Satellite, Information and Communications, vol. 10(3), 2015, pp. 32-37 See International Search.
International Search Report Corresponding to PCT/KR2020/016852 mailed Jun. 29, 2021.
Written Opinion Corresponding to PCT/KR2020/016852 mailed Jun. 29, 2021.
Korean Office Action Corresponding to 10-2020-0079380 mailed Jun. 23, 2021.
International Search Report Corresponding to PCT/KR2020/016853 mailed Mar. 11, 2021.
Written Opinion Corresponding to PCT/KR2020/016853 mailed Mar. 11, 2021.
Korean Office Action Corresponding to 10-2020-0079381 mailed Jun. 15, 2021.
Japanese Office Action Corresponding to 2022-581429 mailed Dec. 12, 2023.
Extended European Search Report Corresponding to 20943012.3 mailed Jun. 17, 2024.
Chinese Office Action Corresponding to 2020801025438 mailed Mar. 25, 2025.
Chinese Office Action Corresponding to 202080126106 mailed Apr. 30, 2025.

* cited by examiner (a)                                      (b)

DRONE HAVING MULTI-DEGREE-OF-FREEDOM FLIGHT MODE

TECHNICAL FIELD

The present invention relates to a drone with a multiple degree of freedom (DOF) flight mode.

BACKGROUND ART

A multi-rotor or multi-fan flight vehicle called a drone is a type of helicopter that typically has three or more rotors. The multi-rotor flight vehicle may fly while changing a torque and a speed of the rotors and may be easily maintained and manipulated, as compared with a traditional single-rotor helicopter. Due to these advantages and the rapid development of an electronic technology, the multi-rotor flight vehicle has been rapidly applied in various fields. In the past, military unmanned flight vehicles having a large size have been mainly used. However, recently, civil small unmanned flight vehicles have been mainly manufactured. The utilization of the small unmanned flight vehicles has variously increased from image photographing to transport of articles.

Among various types of small unmanned flight vehicles, multi-rotor flight vehicles, which are particularly referred to as a quad rotor, have many advantages over other flight vehicles. The biggest advantage is that a mechanical mechanism is very simple. In the case of the quad-rotor, a trim does not need to be adjusted before flight, a mechanical vibration is not large, and the possibility that a component will be damaged due to fatigue is low. In addition, since it is easy to mathematically model the quad-rotor due to a simple form, the quad-rotor is appropriate for automatic flight, and beginners may easily pilot the quad-rotor unlike other small flight vehicles requiring training for a long period of time in order to pilot the flight vehicles. Further, since the quad-rotor uses several small propellers, it is relatively safe for people unskilled in piloting or management. That is, everybody may easily pilot, maintain, repair, and manage the quad-rotor even though he/she does not have professional knowledge of a flight vehicle or is not more trained in advance. Due to these advantages of the quad-rotor, an influence of the quad-rotor among the civil small unmanned flight vehicles has gradually increased.

Research into control and induction fields of the quad-rotor has been conducted in advance by many researchers. First, in the control field, there was an attempt to directly control a non-linear system using a back-stepping method or a sliding model method or linearize a quad-rotor model using feedback linearization and then control the quad-rotor model, in order to effectively treat characteristics of a non-linear model of the quad-rotor. In addition, in the induction field, a flip operation for rotating a moving body of the quad-rotor by 360° or more in one side direction was performed or a rapid maneuver following a specific trajectory and attitude and an elaborate maneuver of exchanging a ball were enabled.

The multi-rotor flight vehicle such as the quad-rotor may be currently controlled and induced precisely due to a contribution of many researches, but still needs to be functionally improved. Considering the fact that an accurate position and attitude of a flight vehicle present on a three-dimensional space are represented by six variables, a multi-rotor flight vehicle system ultimately becomes an under-actuated system in which a dimension of an input is smaller than a dimension of an output. This factor acts as a limitation in the control and the induction of the multi-rotor flight vehicle. For example, a body of the multi-rotor flight vehicle should be necessarily inclined forward in order to accelerate the multi-rotor flight vehicle forward, and acceleration in a forward direction is not absolutely generated in a state in which the multi-rotor flight vehicle is inclined rearward. That is, it means that an attitude and an acceleration of the multi-rotor flight vehicle may not be completely independent from each other.

Therefore, in the case in which a camera is attached to the body of the multi-rotor flight vehicle to photograph a target, when the multi-rotor flight vehicle changes a direction, the body of the multi-rotor flight vehicle is also inclined, such that a photographing direction of the camera is out of the target to be photographed. In addition, since inclination of the entire multi-rotor flight vehicle is required at the time of changing the direction, responsibility is relatively low, such that a rapid maneuver is not easy. For this reason, a separate device capable of maintaining the camera according to the angle change of the fuselage is used, resulting in increasing the number of parts and costs, increasing the weight, and shortening the use time of the battery. In addition, since such a camera connection device is vulnerable to vibration, a separate dust absorption means is sometimes installed, which has a disadvantage in that the device becomes complicated as much.

RELATED PRIOR ART

Korean Patent Laid-Open Publication No. 10-2017-0061941 (published on Jun. 7, 2017)

Korean Patent Publication No. 10-1692315 (registered on Dec. 28, 2016)

DISCLOSURE

Technical Problem

An object of the present invention is to realize various flight modes by enabling a drone to stably have multiple degree of freedom (DOF) and maintain a shake-free state without the need to install a separate device for installing a camera.

Technical Solution

In one general aspect, a drone with a multiple DOF flight mode includes: a fuselage in which a battery is mounted and a forward direction is set in an x-axis; a first rotor and a second rotor each having its rotational axis aligned in a z-axis direction, and disposed to face each other about the fuselage at a first position when viewed in an x-axis direction; a third rotor and a fourth rotor each having its rotational axis aligned in the z-axis direction and disposed to face each other in a y-axis direction at a second position of the fuselage when viewed in the x-axis direction; a first frame shaft rotatably supported with respect to the fuselage about a y1-axis parallel to the y-axis at the first position and supporting the first rotor and the second rotor by respective support shafts parallel to the x-axis at both end portions; a second frame shaft rotatably supported with respect to the fuselage about a y2-axis parallel to the y-axis at the second position and supporting the first rotor and the second rotor by respective support shafts parallel to the x-axis at both end portions; a third frame shaft disposed to be spaced apart from the first frame shaft in the z-axis direction by a plurality of first rod parts and formed to tilt the first rotor and the second rotor about each axis parallel to the x-axis while being moved by a force acting in parallel to the y-axis; a fourth frame shaft disposed to be spaced apart from the second frame shaft in the z-axis direction by a plurality of second rod parts and formed to tilt the third rotor and the fourth rotor about each axis parallel to the x-axis while being moved by a force acting in parallel to the y-axis; a first drive motor unit connected through a first conversion mechanism unit and providing a force to the third frame shaft and the fourth frame shaft in a direction parallel to the y-axis; a second drive motor unit connected through a second conversion mechanism unit and providing a force to rotate the first frame shaft and the second frame shaft about the y1-axis and the y2-axis, respectively; and a control unit configured to implement a plurality of flight modes by controlling the first rotor, the second rotor, the third rotor, the fourth rotor, the first drive motor unit, and the second drive motor unit, in which the plurality of flight modes include: a first flight mode in which both the first drive motor unit and the second drive motor unit are stopped and the speeds of the first to fourth rotors are individually controlled; and a second flight mode in which the first drive motor unit and the second drive motor unit are individually controlled and operated, and the speeds of the first to fourth rotors are individually controlled.

The first conversion mechanism unit may include a first transmission rod configured to simultaneously transmit a driving force of the first drive motor unit to the third frame shaft and the fourth frame shaft.

The second conversion mechanism unit may include a second transmission rod configured to simultaneously transmit a driving force of the second drive motor unit to the first frame shaft and the second frame shaft.

The first flight mode may include: a 1-1th flight mode in which the fuselage is tilted in the x-axis direction or the fuselage moves in the y-axis direction; a 1-2th flight mode in which the fuselage is tilted in the y-axis direction or the fuselage moves in the x-axis direction; a 1-3th flight mode in which the fuselage rotates about the z-axis; and a 1-4th flight mode in which the fuselage moves in the z-axis direction.

The second flight mode may include: a 2-1th flight mode in which the fuselage moves in the y-axis direction by maintaining the fuselage horizontally and tilting the first to fourth rotors about each axis parallel to the x-axis; a 2-2th flight mode in which the fuselage moves in the y-axis direction by maintaining the fuselage horizontally and tilting the first to fourth rotors about each axis parallel to the y-axis; a 2-3th flight mode in which the fuselage rotates about the z-axis by maintaining the fuselage horizontally and individually controlling the speeds of the first to fourth rotors; a 2-4th flight mode in which the fuselage rotates in the z-axis direction by maintaining the fuselage horizontally and individually controlling the speeds of the first to fourth rotors; a 2-5th flight mode in which the fuselage rotates about the x-axis by rotating the first to fourth rotors about each axis parallel to the x-axis; and a 2-6th flight mode in which the fuselage rotates about the y-axis by rotating the first to fourth rotors about each axis parallel to the y-axis.

The 2-5th flight mode may include a posture in which each rotational axis of the first to fourth rotors is parallel to the z-axis, and the fuselage rotates about the x-axis to maintain a tilted state with respect to the ground.

The 2-6th flight mode may include a posture in which each rotational axis of the first to fourth rotors is parallel to the z-axis, and the fuselage rotates about the y-axis to maintain a tilted state with respect to the ground.

A drone with a multiple DOF flight mode includes: a fuselage in which a battery is mounted and a forward direction is set in an x-axis; a plurality of rotors disposed around the fuselage in four or more, each rotational axis of which is aligned in a z-axis direction; an x-axis tilting mechanism unit formed to tilt the plurality of rotors about an axis parallel to the x-axis; a y-axis tilting mechanism unit formed to tilt the plurality of rotors about an axis parallel to the y-axis; a first drive motor unit driving the y-axis tilting mechanism unit; a second drive motor unit guiding the x-axis tilting mechanism unit; and a control unit configured to implement a plurality of flight modes by controlling the first rotor, the second rotor, the third rotor, the fourth rotor, the first drive motor unit, and the second drive motor unit, in which the plurality of flight modes include: a first flight mode in which both the first drive motor unit and the second drive motor unit are stopped and the speeds of the first to fourth rotors are individually controlled; and a second flight mode in which the first drive motor unit and the second drive motor unit are individually controlled and operated, and the speeds of the first to fourth rotors are individually controlled.

Advantageous Effects

According to a drone with multiple DOF flight mode related to the present invention, a plurality of rotors are configured so that they may be tilted independently about an x-axis and a y-axis, and even when a rotor rotates or an attitude or speed of the rotor changes, a main body may maintain a posture as it is or may be set to a desired specific posture, thereby realizing various flights.

According to an example related to the present invention, it is possible to realize a first flight mode having 4 DOF by individually controlling speeds of a plurality of rotors, and a second flight mode having 6 DOF by tilting the plurality of rotors in x-axis and y-axis directions.

BRIEF DESCRIPTION OF THE DRAWINGS

FIG. 7 is a view illustrating a hovering state;

FIGS. 8 and 9 are diagrams illustrating that the drone moves forward and backward (x-axis direction) and rotates about the y-axis, FIGS. 10 and 11 are diagrams illustrating that the drone moves left and right (y-axis direction) and rotates about the x-axis, FIG. 12 is a diagram illustrating the concept of moving a drone in a z-axis direction.

FIG. 13 is a diagram illustrating that the drone rotates about the z-axis.

FIG. 14 is a diagram illustrating that the drone moves forward and backward.

FIG. 15 is a diagram illustrating that the drone moves left and right.

FIG. 16 is a diagram illustrating that the fuselage rotates about the x-axis.

FIG. 17 is a diagram illustrating that the fuselage rotates about the y-axis.

BEST MODE

Figure 1:
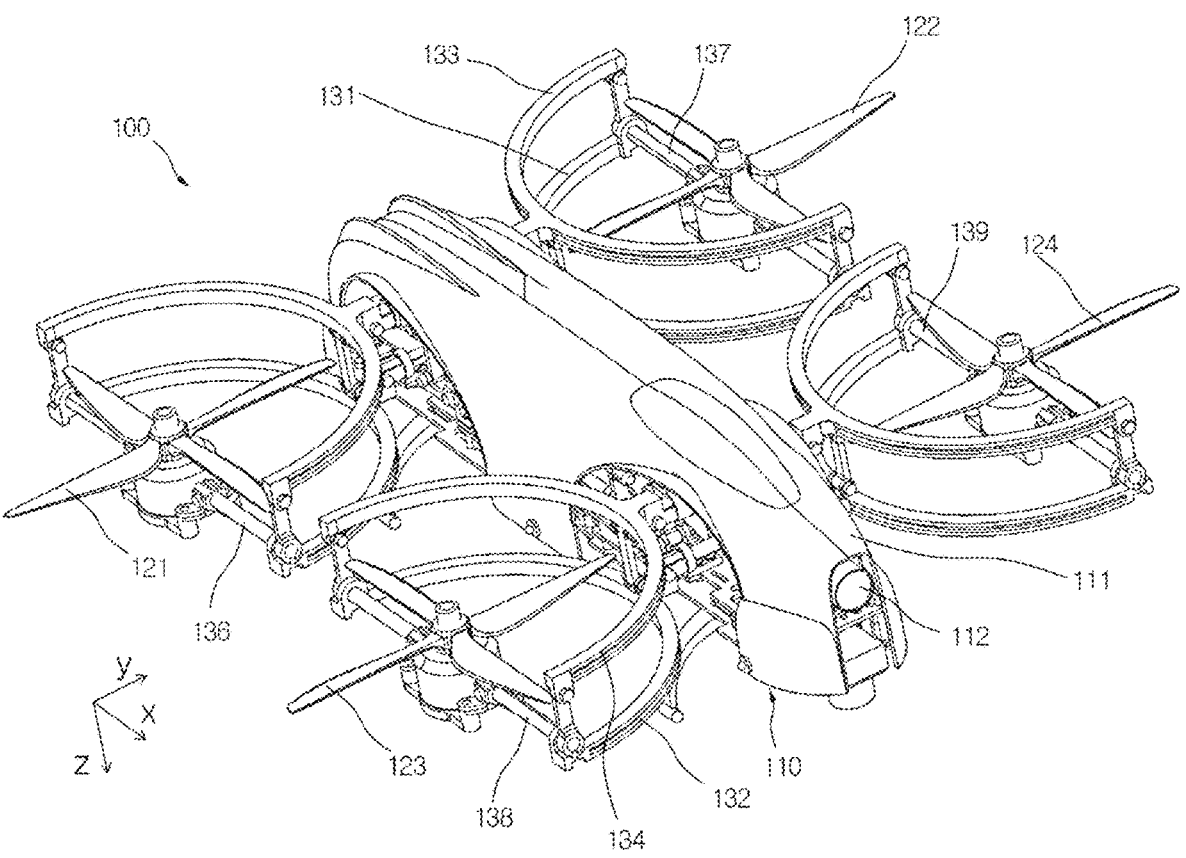
FIG. 1 is a perspective view of a drone 100 according to an example related to the present invention.

Hereinafter, a drone with a multiple degree of freedom (DOF) flight mode related to the present invention will be described in detail with reference to the accompanying drawings. Throughout the present disclosure, components that are the same as or similar to each other will be denoted by reference numerals that are the same as or similar to each other and a description therefor will be replaced by the first description, in different exemplary embodiments.

According to FIG. 1, a drone 100 with multiple DOF flight mode related to the present invention includes a fuselage 110 in the middle and a plurality of rotors 121, 122, 123, and 124 disposed around the fuselage 110. To support the rotors 121, 122, 123, and 124, a first frame shaft 131, a second frame shaft 132, a third frame shaft 133, and a fourth frame shaft 134 are installed in a fuselage 110.

When a coordinate system is defined for convenience for explanation, the fuselage 110 is placed in an x-axis direction, which is a front-back direction, a left-right direction of the fuselage 110 is a y-axis direction, and an up-down direction of the fuselage 110 is a z-axis direction. The rotors 121, 122, 123, and 124 each have its rotational axes aligned in the z-axis direction.

A plurality of rotors may be arranged in pairs at a plurality of locations along the fuselage 110 (x-axis direction). FIG. 1 illustrates one such example, in which two pairs are arranged. That is, the first rotor 121 and the second rotor 122 form a pair at the rear end of the fuselage 110, and the third rotor 123 and the fourth rotor 124 forms one pair at the front end of the fuselage 110. The first rotor 121 and the second rotor 122 are supported by the first frame shaft 131 and the third frame shaft 133, and the third rotor 123 and the fourth rotor 124 are supported by the second frame shaft 132 and the fourth frame shaft 134.

The plurality of rotors 121, 122, 123, and 124 are supported by respective support shafts 136, 137, 138, and 139 parallel to the x-axis. The support shafts 136, 137, 138, and 139 are installation spaces for cables that supply power to each rotor, and also serve as primary support points for tilting the rotors 121, 122, 123, and 124 by control.

Figure 2:
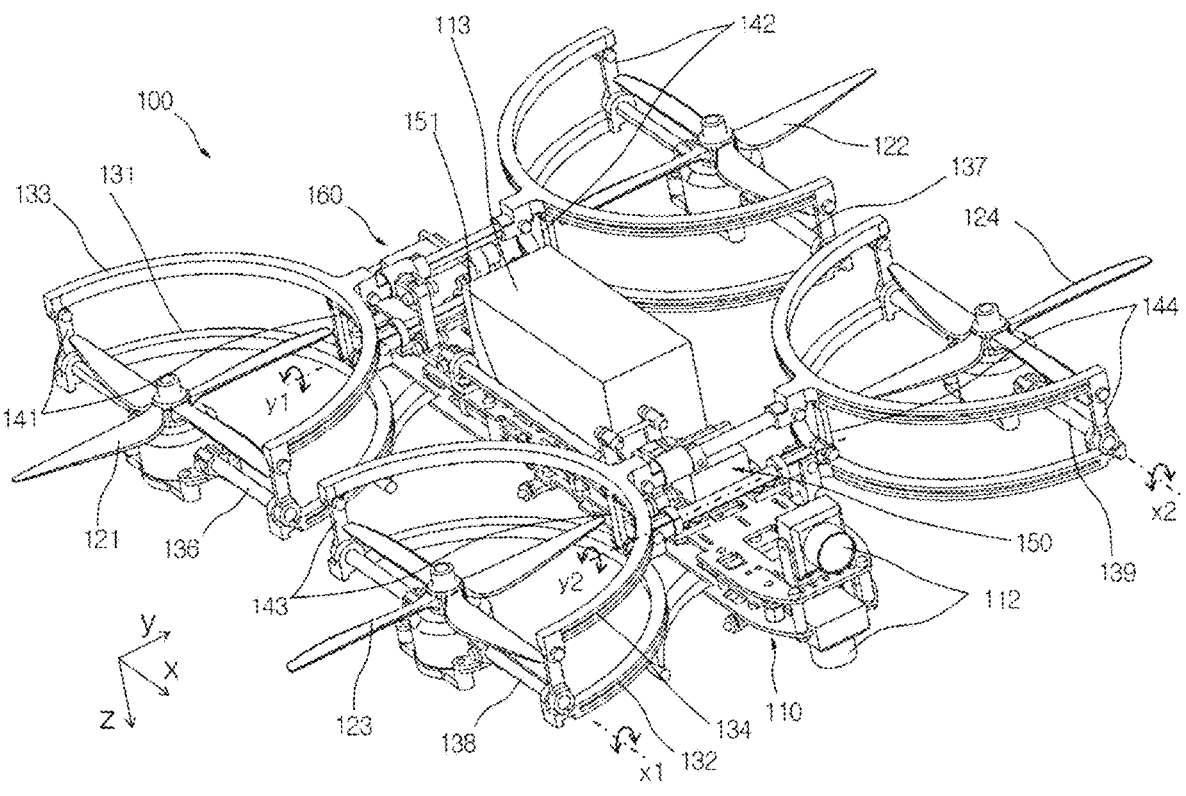
FIG. 2 is a perspective view illustrating a state in which a housing 111 is separated from the drone 100 of FIG. 1.

The fuselage 110 may have a form in which internal parts are covered by the housing 111. A camera 112 may be disposed in front of the fuselage 110. As illustrated in FIG. 2, the camera 112 is directly installed on a board, and does not use elements such as a separate gimbal in order to reduce shaking. As will be described later, this is due to the fact that the shaking of the camera 112 is reduced and the camera 112 can be accurately and easily directed in a desired direction by the configuration and flight mode of the drone related to the present invention.

As illustrated in FIG. 2, a battery 113 for supplying power to components is disposed in the fuselage 110. In order to reduce the power consumption of the battery 113 and increase the flight time, the present invention omitted the arrangement of the gimbal and additional parts as described above and reduced the weight as much.

The plurality of frame shafts 131, 132, 133, and 134 for supporting the plurality of rotors 121, 122, 123, and 124 are formed to be a structure in which both "fixing" and "tilting" of the rotors are possible. To this end, as an example, the plurality of frame shafts includes a first frame shaft 131 that is rotatably supported with respect to the fuselage 110 about a y1 axis parallel to the y-axis at the rear end of the fuselage 110, a second frame shaft 132 that is rotatably supported with respect to the fuselage 110 about a y2 axis parallel to the y-axis at the front end of the fuselage 110, a third frame shaft 133 that is disposed spaced apart from the first frame shaft 131 in the z-axis direction by a plurality of first rod parts 141 and 142, and a fourth frame shaft 134 that is disposed spaced apart from the second frame shaft 132 in the z-axis direction by a plurality of second rod parts 143 and 144. That is, the first frame shaft 131 and the second frame shaft 132 are rotatably supported in the y-axis direction with respect to the fuselage 110, and the third frame shaft 133 and the fourth frame shaft 134 are not fixed with respect to the fuselage 110, but move by a driving force in a state of being constrained with respect to the first frame shaft 131 and the second frame shaft 132 by the respective rod parts 141, 142, 143, and 144. In this example, the third frame shaft 133 and the fourth frame shaft 134 move in the y-axis direction and serve to rotate support shafts 136, 137, 138, and 139, which primarily support the plurality of rotors 121, 122, 123, and 124 about each axis parallel to the x-axis.

A first conversion mechanism unit is provided to drive the third frame shaft 133 and the fourth frame shaft 134, and the first conversion mechanism unit receives a driving force of the first drive motor unit 150 and converts the received driving force into a force for moving the third frame shaft 133 and the fourth frame shaft 134 in a direction parallel to the y-axis. However, since the third frame shaft 133 and the fourth frame shaft 134 are constrained by the first rod parts 141 and 142, they move in a direction of turning around an x1 axis and an x2 axis, which are relatively parallel to the x-axis, respectively, with respect to the first frame shaft 131 and the second frame shaft 132. The first conversion mechanism unit includes a first transmission rod 151 so as to transmit the driving force of the first drive motor unit 150 to the third frame shaft 133 and the fourth frame shaft 134 at the same time. The first transmission rod 151 extends in the x-axis direction and simultaneously moves the third frame shaft 133 and the fourth frame shaft 134 in the y-axis direction by rotating the link members at opposite end portions while rotating by the rotational force transmitted from the first drive motor unit 150.

Figure 3:
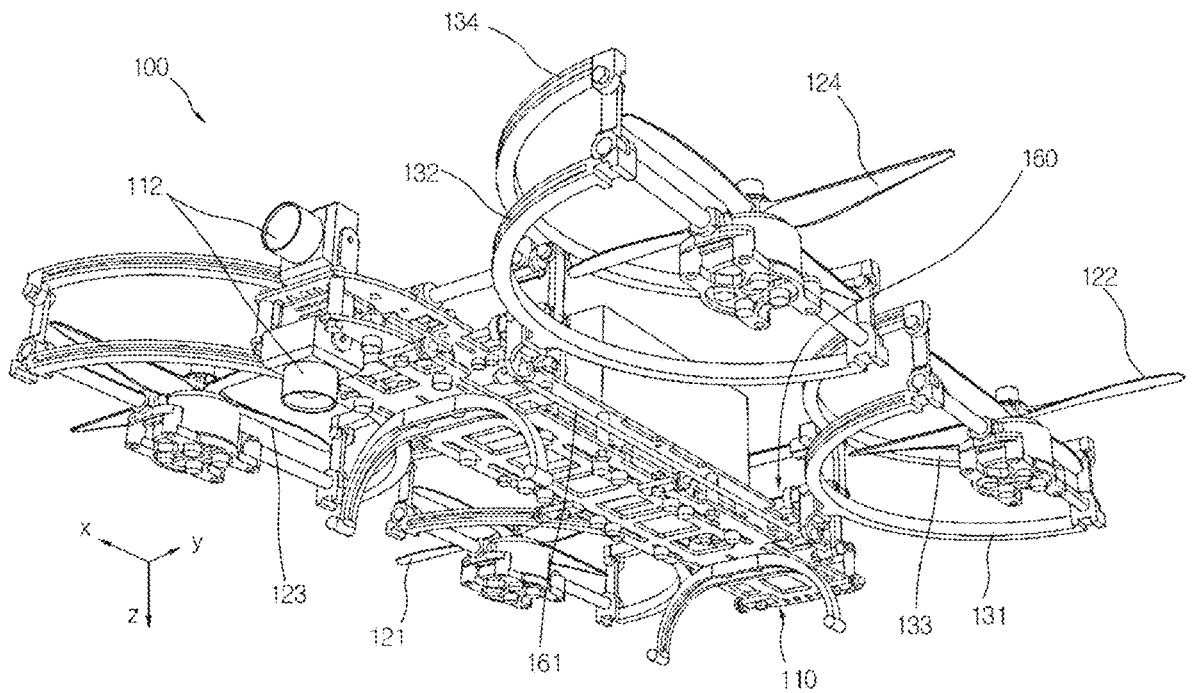
FIG. 3 is a perspective view of the drone 100 of FIG. 2 viewed from the bottom.

As illustrated in FIG. 3, the first frame shaft 131 and the second frame shaft 132 are connected by a second conversion mechanism unit, and the second conversion mechanism unit is connected by a second drive motor unit 160 to transmit the rotational force of the second drive motor unit 160 to rotate the first frame shaft 131 and the second frame shaft 132 about respective rotational axes y1 and y2. The second conversion mechanism unit includes a second transmission rod 161 formed to transmit the driving force of the second drive motor unit 160 to the first frame shaft 131 and the second frame shaft 132 at the same time. The second transmission rod 161 also extends in the x-axis direction, but moves in the x-axis direction by receiving the driving force of the second drive motor unit 160, so the second transmission rod 161 provides a torque to the first frame shaft 131 and the second frame shaft 132.

Figure 4:
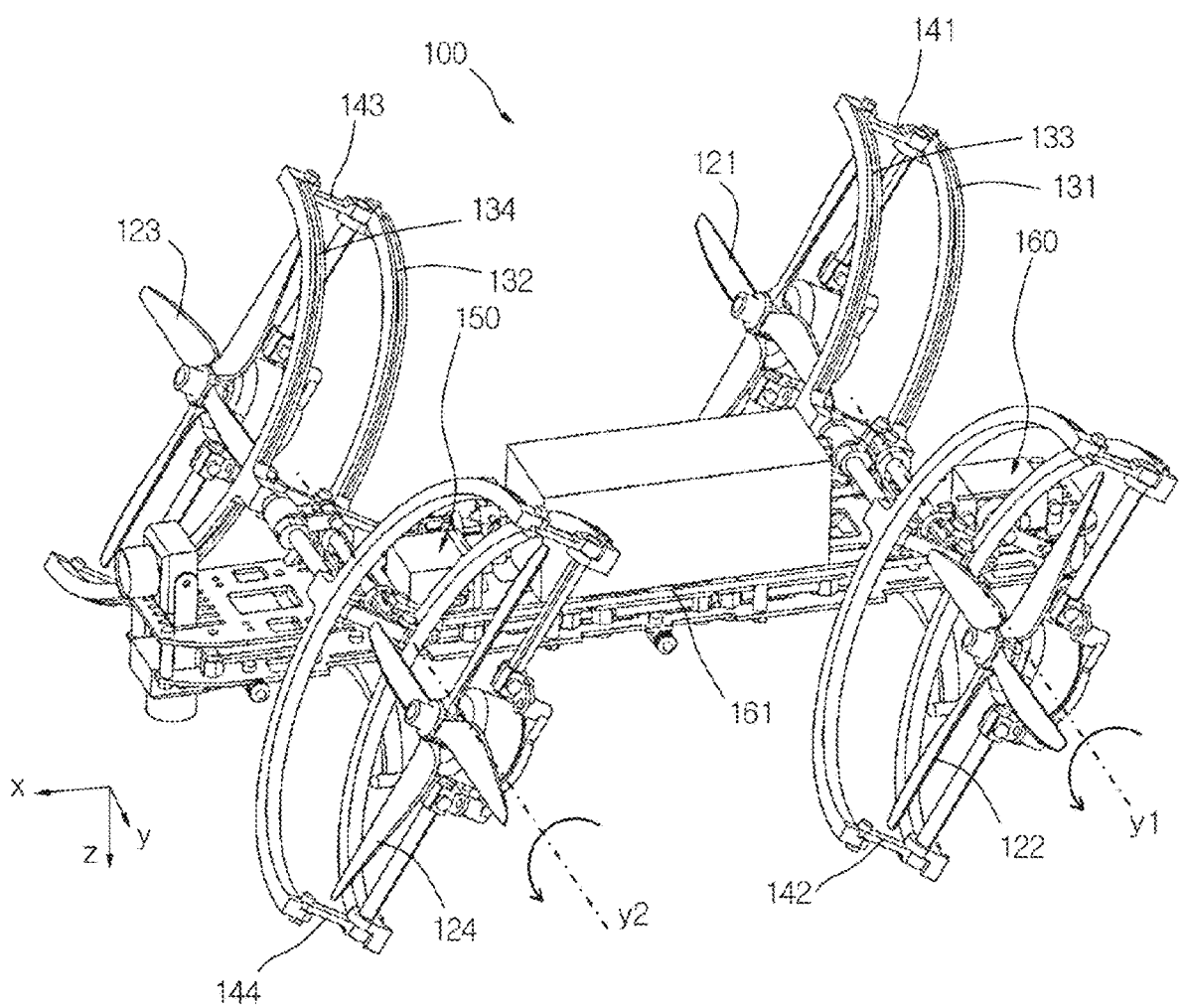
FIG. 4 is a perspective view illustrating a state in which a plurality of rotors are tilted about a y-axis in the state of FIG. 2.

The operation of such a configuration will be described with reference to FIGS. 4 to 6. FIG. 4 illustrates that the second transmission rod 161 moves in the x-axis direction by the driving force of the second drive motor unit 160 to rotate the first frame shaft 131 and the second frame shaft 132, so the first rotor 121 and the second rotor 122 rotates about the y1 axis, and the third rotor 123 and the fourth rotor 124 rotates about the y2 axis, respectively. The tilting of the plurality of rotors 121, 122, 123, and 124 in the y-axis direction causes a change in angle with respect to the fuselage 110, and the thrust of the rotors 121, 122, 123, and 124 tilts the fuselage 110 in the y-axis direction as well.

Figure 5:
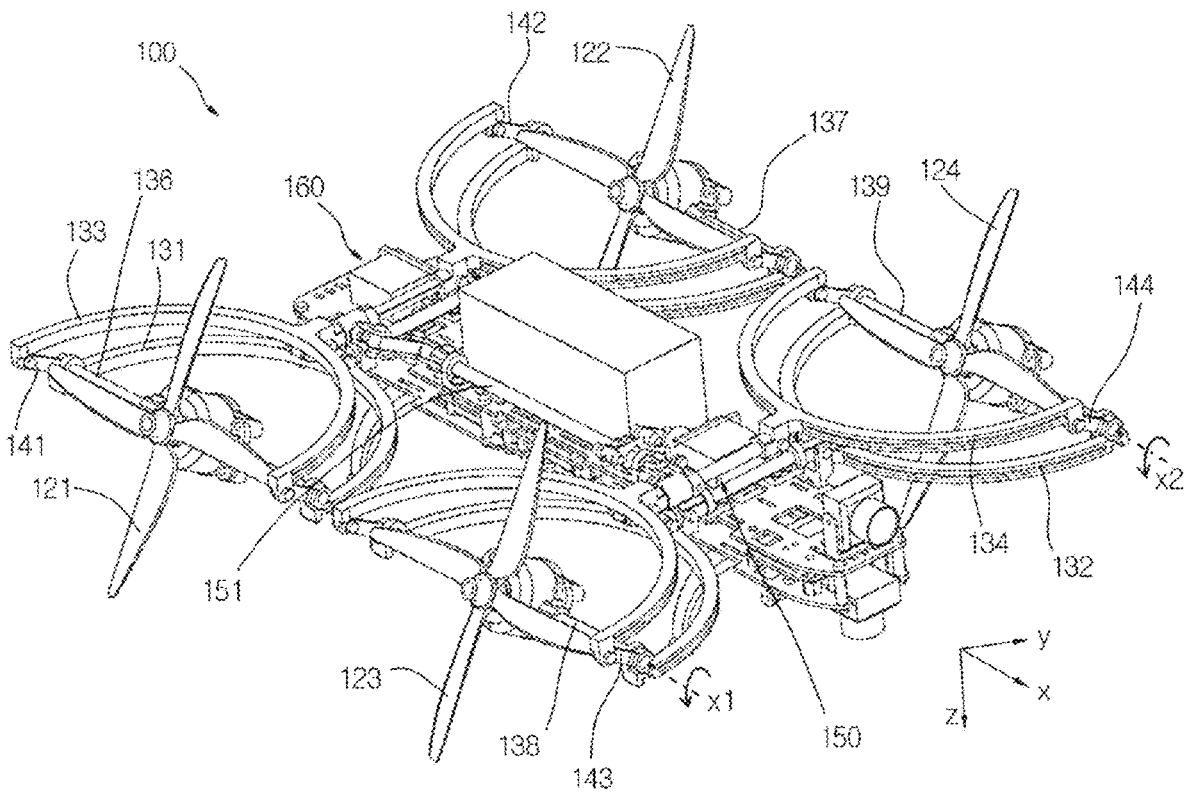
FIG. 5 is a perspective view illustrating a state in which the plurality of rotors are tilted about an x-axis in the state of FIG. 2.

FIG. 5 illustrates that the first transmission rod 151 rotates about the x-axis by the driving force of the first drive motor unit 150 to move the third frame shaft 133 and the fourth frame shaft 134 in the y-axis direction, so, the support shafts 136, 137, 138, and 139 supporting the rotors 121, 122, 123, and 124 rotate in the x1 and x2 axis directions, respectively, and the rotors 121, 122, 123, and 124 also rotate in the x1 and x2 directions. The tilting of the rotors 121, 122, 123, and 124 induces the fuselage 110 to tilt about the x-axis (tilted to the left or right) or move in the direction of the y-axis (move to the left or right).

Figure 6:
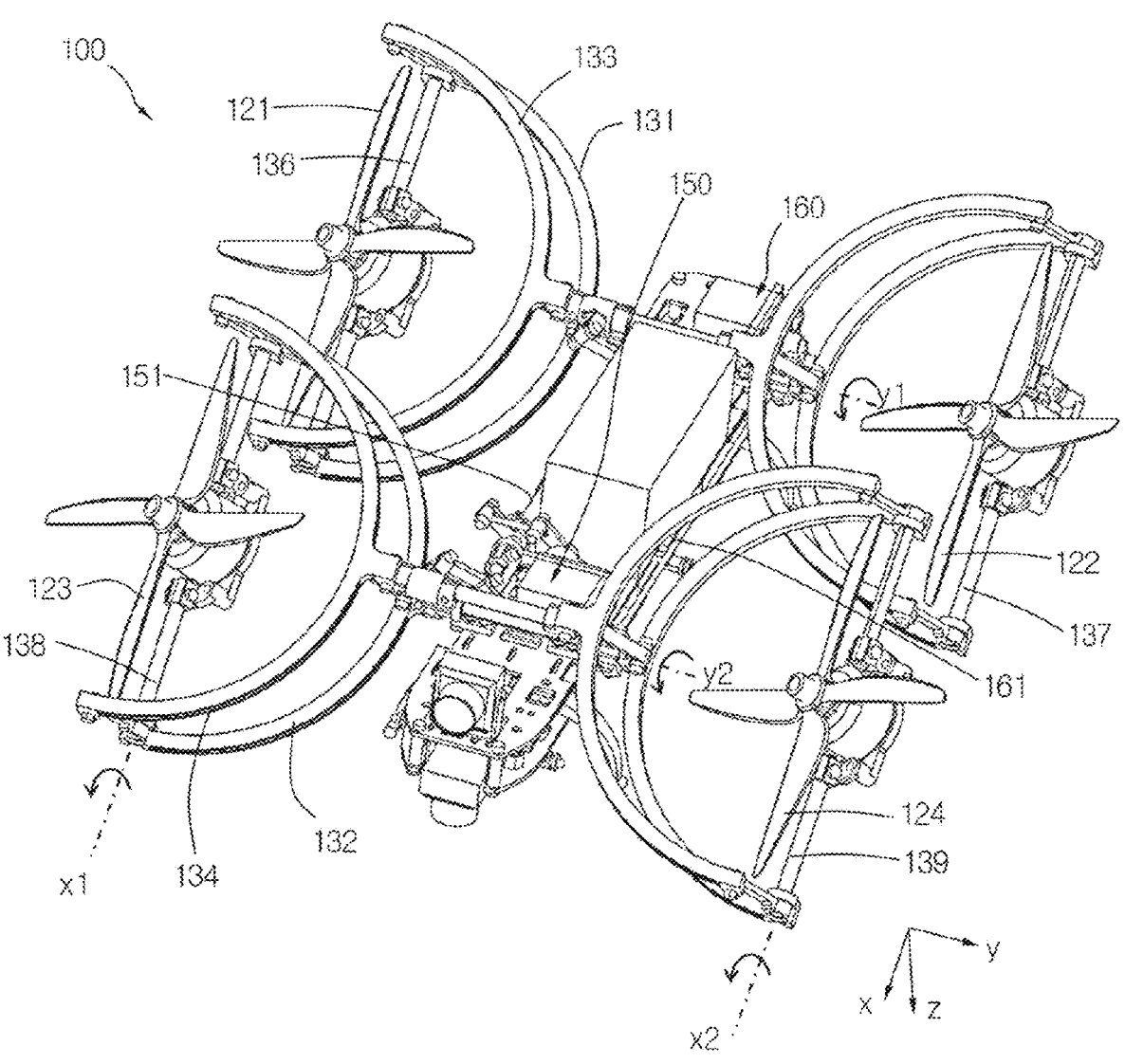
FIG. 6 is a perspective view illustrating a state in which the plurality of rotors are tilted about the x-axis and y-axis in the state of FIG. 2.

FIG. 6 illustrates the results of tilting all the rotors 121, 122, 123, and 124 in the x-axis and the y-axis, respectively, by the action of both the first drive motor unit 150 and the second drive motor unit 160. The tilting of these rotors 121, 122, 123, and 124 move or tilt the fuselage 110 in a diagonal direction.

The drone 100 with multiple DOF related to the present invention includes a control unit that controls the rotors 121, 122, 123, and 124 and the first drive motor unit 150 and the second drive motor unit 160 to implement multiple flight modes. The control unit controls the speeds of the rotors 121, 122, 123, and 124 or controls the operation or rotation angle of the first drive motor unit 150 and the second drive motor unit 160, thereby precisely adjusting the tilting of the rotors 121, 122, 123, and 124. The fuselage 110 is installed with a wireless communication module for communicating with a remote controller on the ground, and the control unit realizes the flight mode according to the input signal.

Hereinafter, the flight mode by the drone 200 with multiple DOF related to the present invention will be described below with reference to FIG. 7 Rotors 221, 222, 223, and 224 in these drawings correspond to the rotors 121, 122, 123, and 124 described above, and elements capable of supporting or tilting these rotors 221, 222, 223, and 224 are also the same as the previous configuration. However, it has been simplified and expressed for convenience of understanding.

A plurality of flight modes by the drone 200 with multiple DOF related to the present invention may include a 4 degree of freedom (DOF) mode and a 6 DOF mode. These 4 DOF mode and 6 DOF mode may be implemented independently or, in some cases, may be implemented simultaneously.

FIGS. 7 to 13 are diagrams illustrating a posture according to a first flight mode of the drone 200 related to the present invention.

Figure 7:
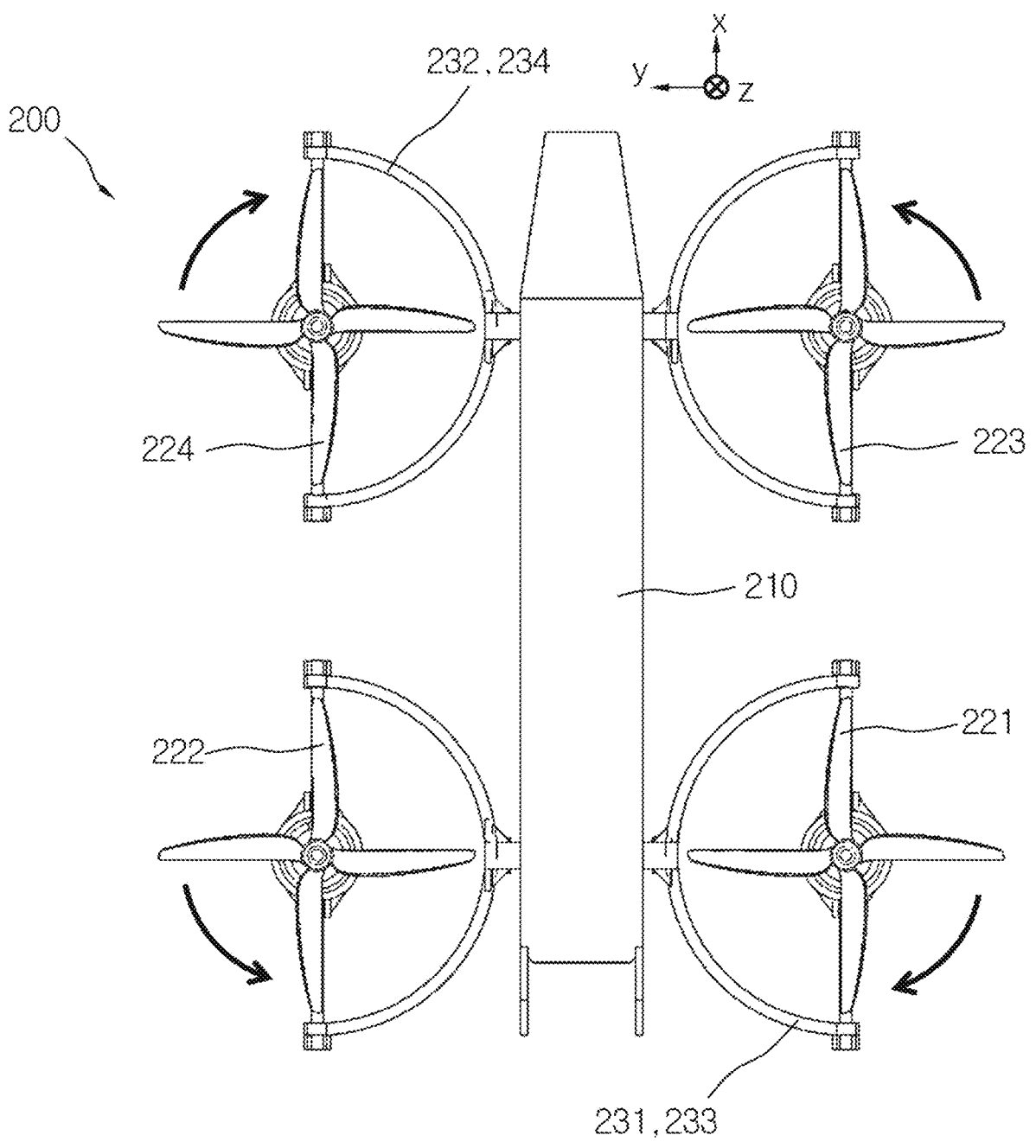
FIGS. 7 to 13 are diagrams illustrating a posture according to a first flight mode of a drone 200 related to the present invention.

FIG. 7 conceptually illustrates a rotational state of the rotors 221, 222, 223, and 224 for forming a hovering state. That is, in order for the fuselage 210 of the drone to hover stably, the rotational directions of the diagonally facing rotors 221, 222, 223, and 224 need to match, and the rotors located side by side have opposite directions to each other. When the magnitude of the rotational speed of the rotors 221, 222, 223, and 224 is the same, the fuselage 210 may be kept level, and when the magnitude of the thrust due to the rotation of the rotor matches that of the gravity of the drone 200, the drone 200 may stably perform hovering, which is a maneuver to stop in the air. The rotors 221, 222, 223, and 224 of the drone 200 of the present example for hovering are controlled by motor speed without separate tilting.

Figure 8:
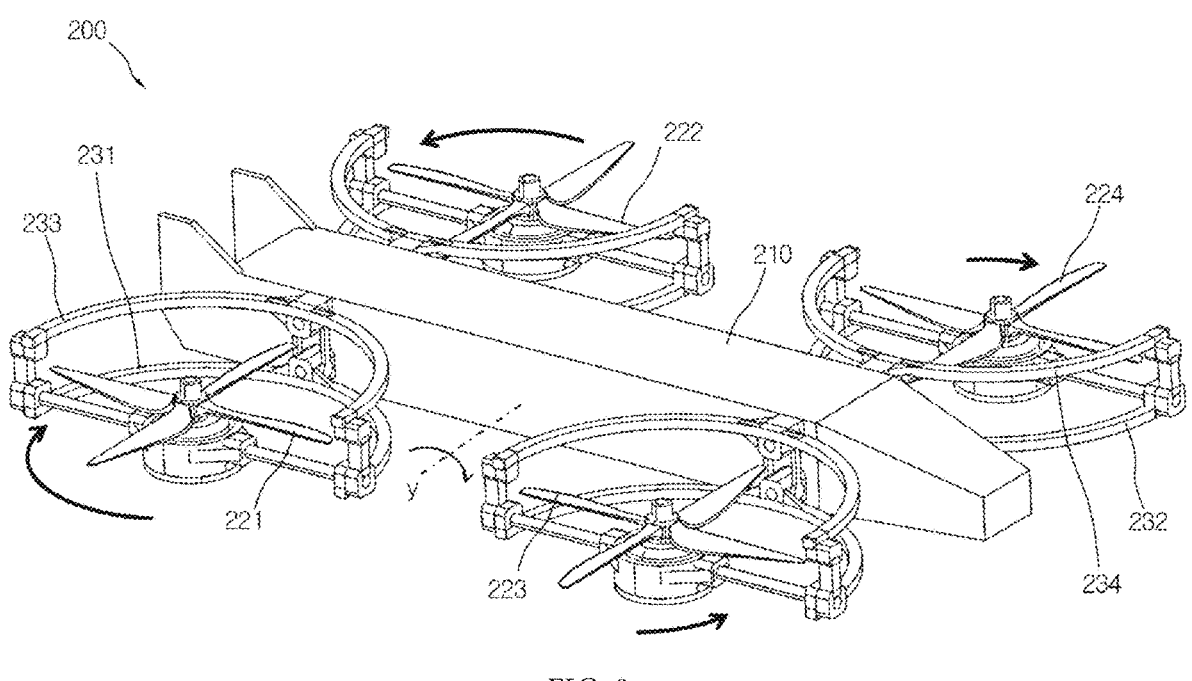
Figure 9:
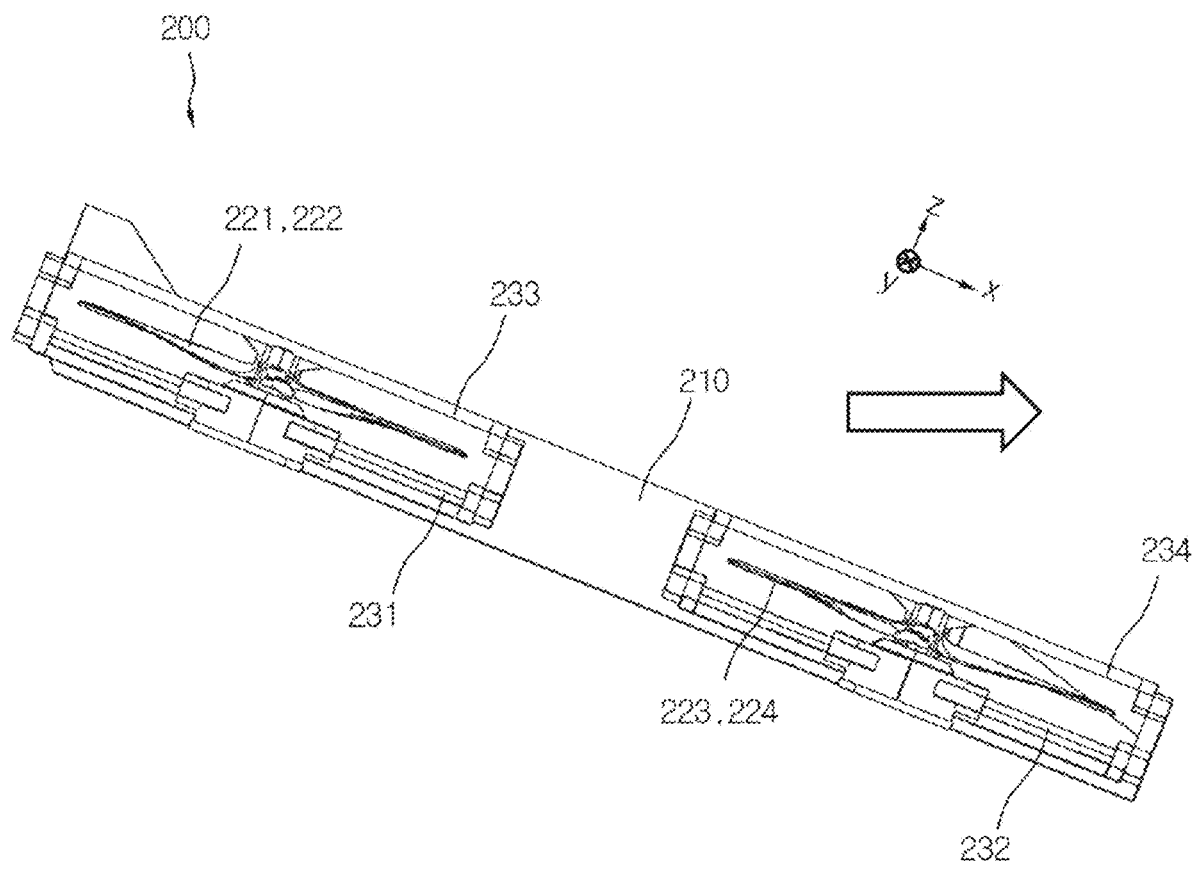

FIGS. 8 and 9 show the relationship between the rotational speeds of the rotors 221, 222, 223, and 224 for the drone 200 to move forward and backward (x direction). That is, in order for the drone 200 to move forward and backward, the angle of the fuselage 210 needs to be tilted forward and backward to change the direction of the thrust. To this end, the fuselage 210 of the drone 200 tilts forward by slowing the rotation speeds of the third rotor 223 and the fourth rotor 224 at the front and increasing the speeds of the first rotor 221 and the second rotor 222 at the rear, so the thrust is directed to the rear of the fuselage 210, so the drone 200 moves forward.

Figure 10:
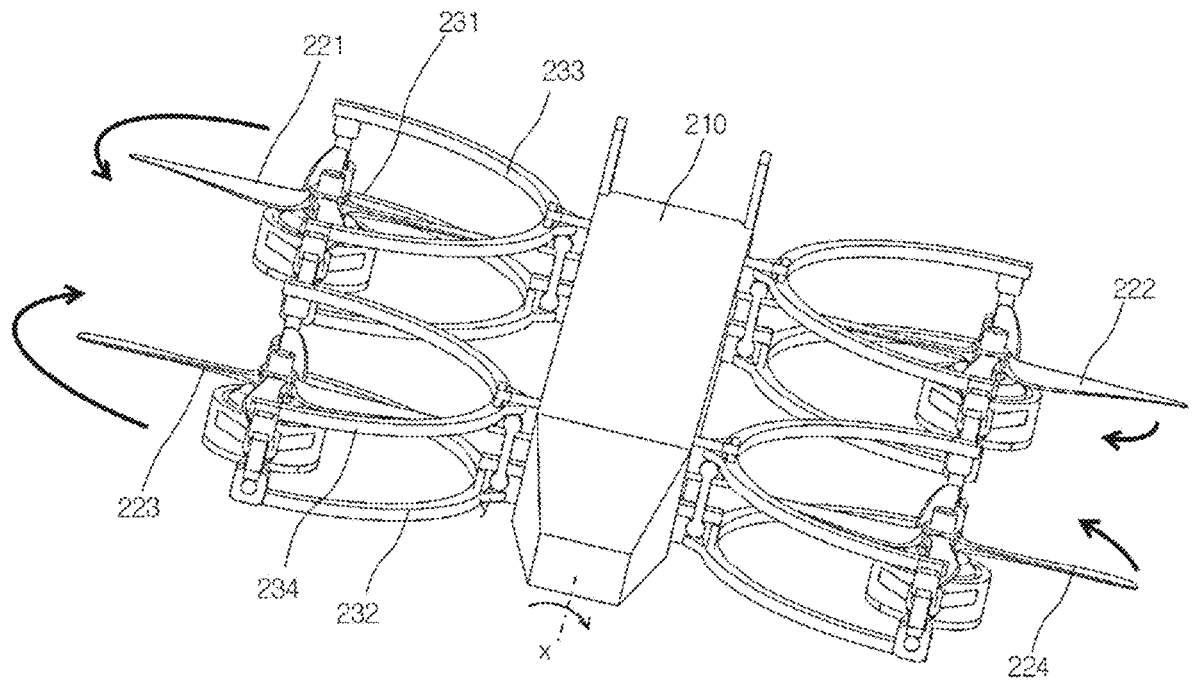
Figure 11:
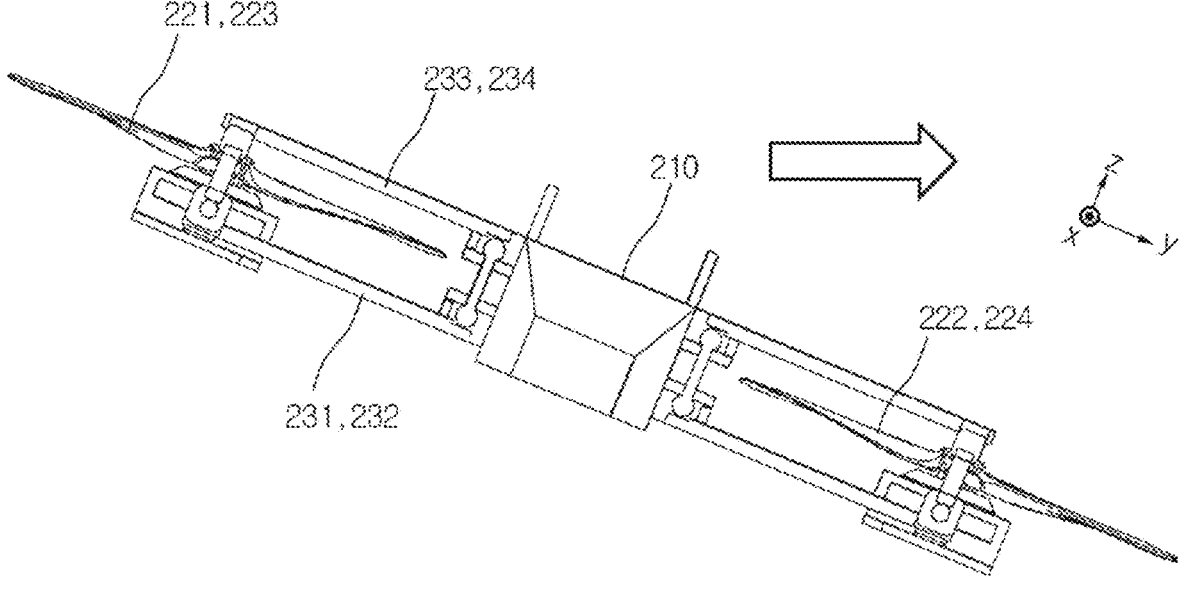

FIGS. 10 and 11 are diagrams illustrating that the drone moves left and right (y-axis direction) and rotates about the x-axis. That is, in order for the drone 200 to move left and right, the angle of the fuselage 210 needs to be tilted left and right to change the direction of the thrust. To this end, the fuselage 210 of the drone 200 tilts to the right by slowing the rotation speeds of the second rotor 222 and the fourth rotor 224 and increasing the speeds of the first rotor 221 and the third rotor 223, so the thrust is directed to the left of the fuselage 210, so the drone 200 moves to the right.

Figure 12:
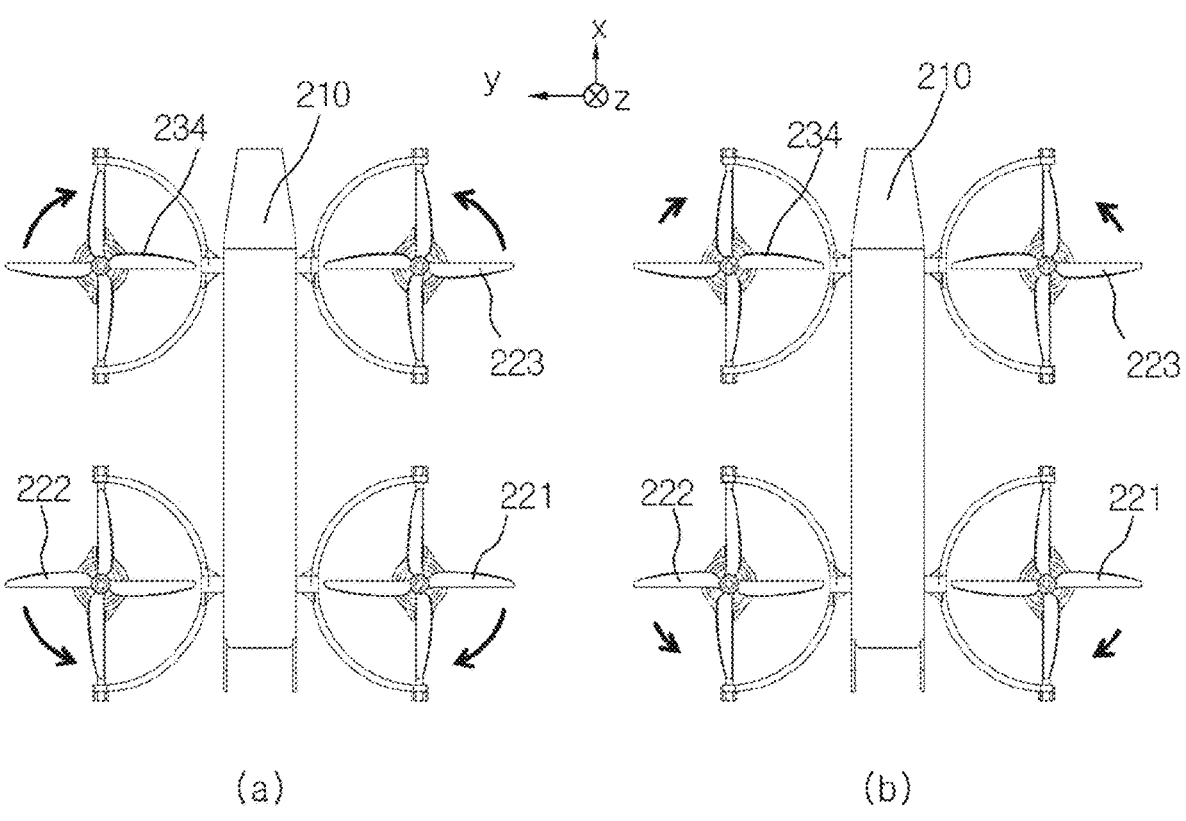

FIG. 12 is a diagram illustrating the concept of moving the drone in the z-axis direction, and the vertical movement of the drone 200 is the same as the principle of hovering. When the rotational speeds of the rotors 221, 222, 223, and 224 equally increase in the state in which the magnitudes of the rotational speeds of the rotors 221, 222, 223, and 224 all match, the altitude rises while the fuselage remains level (FIG. 12A), and conversely, when the rotational speeds of the rotors 221, 222, 223, and 224 are equally reduced, the thrust is reduced, so the altitude drops while the fuselage remains level (FIG. 12B).

Figure 13:
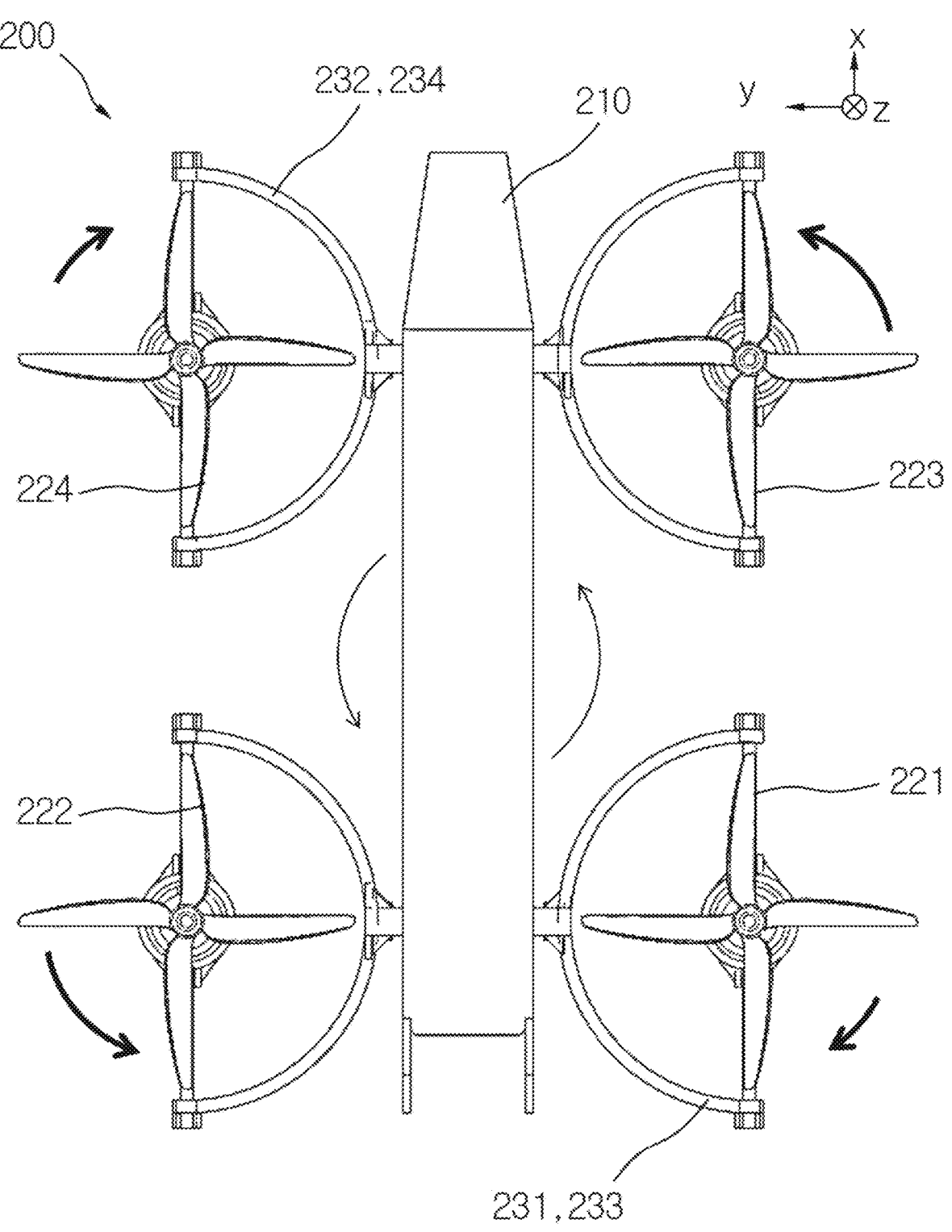

FIG. 13 is a diagram illustrating that the drone rotates about the z-axis. In order to rotate the drone 200 in the z-axis direction, the rotational speed of the rotors that rotate in the z-axis direction and diagonally face each other is lowered at a constant rate, and the rotational speeds of the remaining rotors rotating in the opposite direction to the z-axis increase by the same rate. According to Newton's law of action and reaction, if the sum of rotation vectors in the z-axis direction of the rotors 221, 222, 223, and 224 is greater than 0, the fuselage rotates in the opposite direction to the z-axis due to the reaction.

FIGS. 14 to 17 are diagrams illustrating postures that are not common with the first flight mode among postures according to a second flight mode of the drone 200 related to the present invention. Even in the 6 DOF flight mode, the hovering, the z-axis rotation, the rise and drop may be implemented similarly to the previously described 4 DOF flight mode. In this example, descriptions will be made based on the form that may not be implemented in the 4 DOF flight mode.

Figure 14:
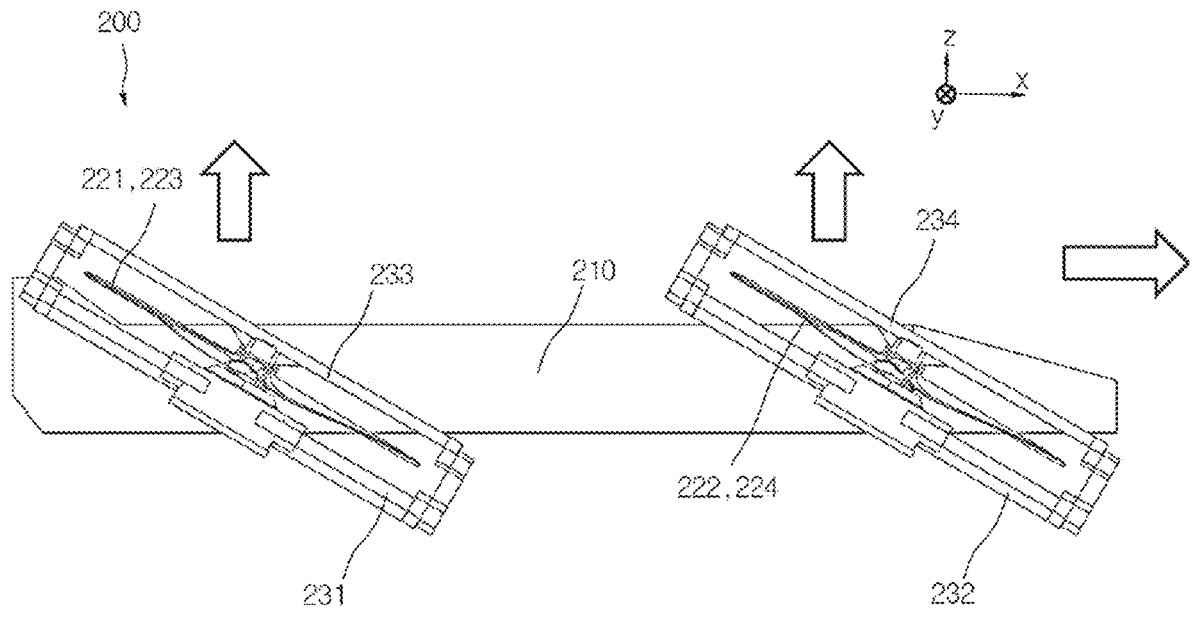
FIGS. 14 to 17 are diagrams illustrating postures that are not common with the first flight mode among postures according to a second flight mode of the drone 200 related to the present invention.

FIG. 14 is a diagram illustrating that the drone moves forward and backward, That is, in order to move the drone 200 forward and backward, the rotors 221, 222, 223, and 224 are tilted forward while maintaining hovering (referring to tilting by rotating about the y-axis). In this case, the mechanism for maintaining the fuselage 210 horizontally is similar to when hovering.

Figure 15:
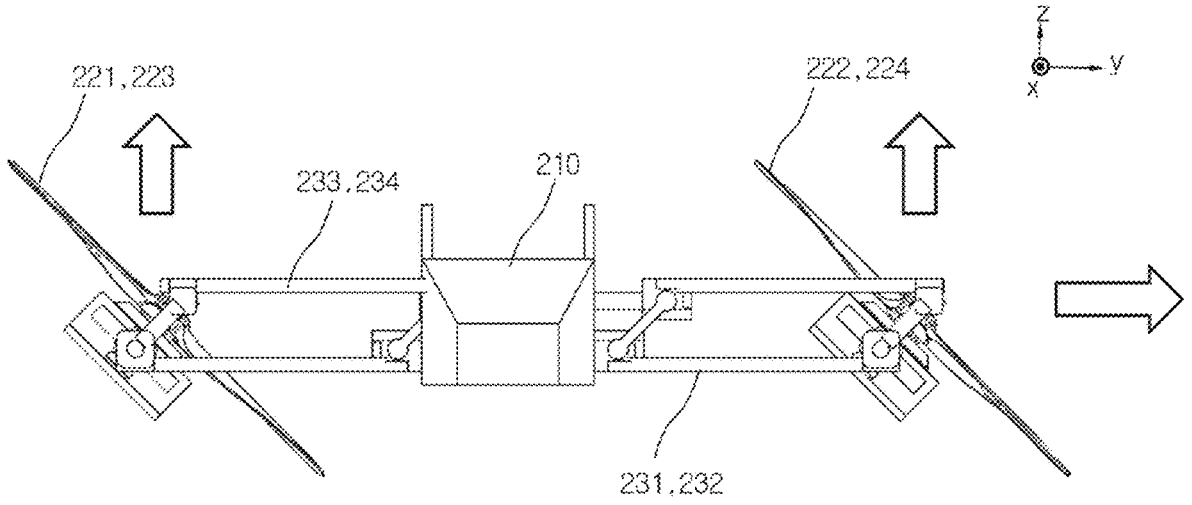

FIG. 15 is a diagram illustrating that the drone moves left and right. That is, in order to move the drone 200 left and right, the rotors 221, 222, 223, and 224 are tilted left and right while maintaining the hovering (referring to tilting by rotating about the x-axis). In this case, the mechanism for maintaining the fuselage 210 horizontally is similar to when hovering.

Figure 16:
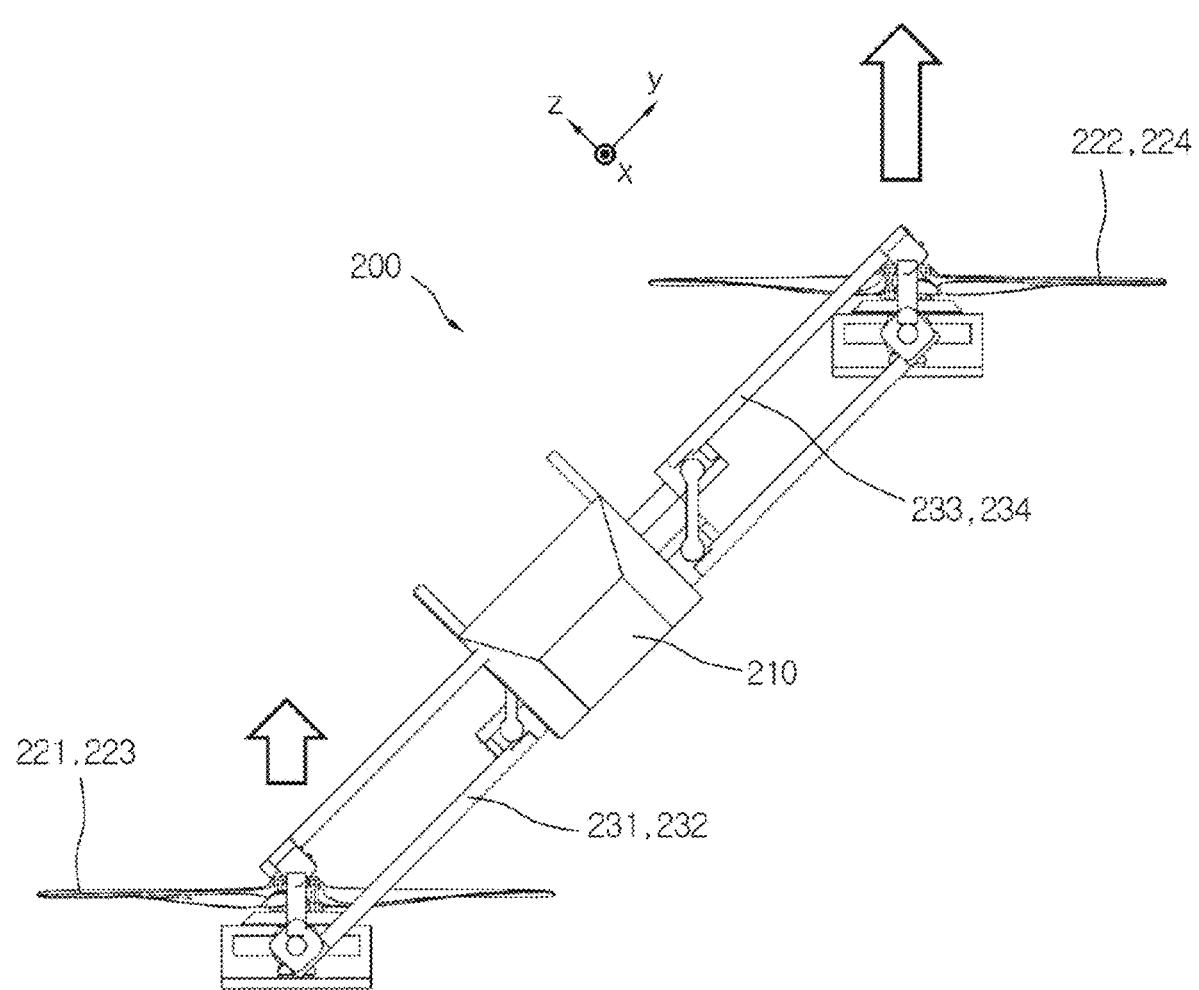

FIG. 16 is a diagram illustrating that the fuselage rotates about the x-axis, That is, in order to tilt the fuselage 210 about the x-axis while hovering, when the rotational speeds of the second rotor 222 and the fourth rotor 224 on the right increase, and the rotational speeds of the first rotor 221 and the third rotor 223 on the left decrease, the fuselage 210 of the drone 200 rotates about the x-axis.

When the fuselage 210 rotates, the direction of the thrust changes while the rotors 221, 222, 223, and 224 also rotate in the same direction, so the fuselage 210 moves. To compensate for this, the angles of the rotors 221, 222, 223, and 224 may change by the same amount in the direction opposite to the direction in which the fuselage 210 rotates.

Figure 17:
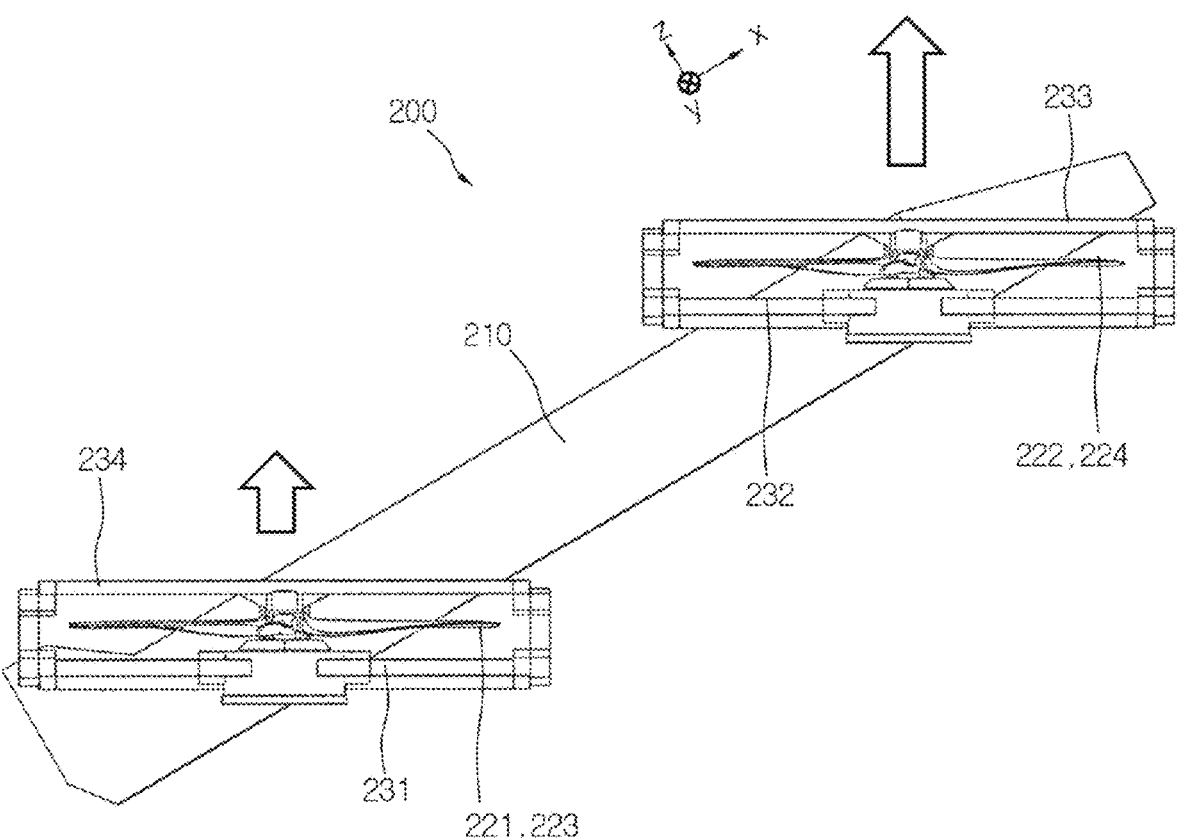

FIG. 17 is a diagram illustrating that the fuselage rotates about the y-axis, That is, in order to tilt the fuselage 210 about the y-axis while hovering, when the rotational speeds of the third rotor 223 and the fourth rotor 224 at the front increase, and the rotational speeds of the first rotor 221 and the second rotor 222 at the rear decrease, the fuselage 210 of the drone 200 rotates about the y-axis.

Similar to FIG. 16, when the fuselage 210 rotates, the direction of the thrust changes while the rotors 221, 222, 223, and 224 also rotate in the same direction, so the fuselage 210 moves. To compensate for this, the angles of the rotors 221, 222, 223, and 224 may change by the same amount in the direction opposite to the direction in which the fuselage 210 rotates.

The drone with a multiple DOF flight mode described above is not limited to the configuration and method of the described embodiments. All or some of the respective exemplary embodiments may be selectively combined with each other so that the above-mentioned exemplary embodiments may be variously modified.

The invention claimed is:

1. A drone with a multiple DOF flight mode, comprising:
a fuselage in which a battery is mounted and a forward direction is set in an x-axis;
a first rotor and a second rotor each having its rotational axis aligned in a z-axis direction, and disposed to face each other about the fuselage at a first position when viewed in an x-axis direction;
a third rotor and a fourth rotor each having its rotational axis aligned in the z-axis direction and disposed to face each other in a y-axis direction at a second position of the fuselage when viewed in the x-axis direction;
a first frame shaft rotatably supported with respect to the fuselage about a y1-axis parallel to the y-axis at the first position and supporting the first rotor and the second rotor by respective support shafts parallel to the x-axis at both end portions;
a second frame shaft rotatably supported with respect to the fuselage about a y2-axis parallel to the y-axis at the second position and supporting the third rotor and the fourth rotor by respective support shafts parallel to the x-axis at both end portions;
a third frame shaft disposed to be spaced apart from the first frame shaft in the z-axis direction by a plurality of first rod parts and formed to tilt the first rotor and the second rotor about each axis parallel to the x-axis while being moved by a force acting in parallel to the y-axis;
a fourth frame shaft disposed to be spaced apart from the second frame shaft in the z-axis direction by a plurality of second rod parts and formed to tilt the third rotor and the fourth rotor about each axis parallel to the x-axis while being moved by a force acting in parallel to the y-axis;
a first drive motor unit connected through a first conversion mechanism unit and providing a force to the third frame shaft and the fourth frame shaft in a direction parallel to the y-axis;
a second drive motor unit connected through a second conversion mechanism unit and providing a force to rotate the first frame shaft and the second frame shaft about the y1-axis and the y2-axis, respectively; and
a control unit configured to implement a plurality of flight modes by controlling the first rotor, the second rotor, the third rotor, the fourth rotor, the first drive motor unit, and the second drive motor unit,
wherein the plurality of flight modes include:
a first flight mode in which both the first drive motor unit and the second drive motor unit are stopped by inhibiting drive signals to the first drive motor unit and the second drive motor unit such that tilting angles of the first to fourth rotors are maintained and the speeds of the first to fourth rotors are individually controlled; and
a second flight mode in which the first drive motor unit and the second drive motor unit are individually controlled and operated to change tilting angles of the first to fourth rotors, and the speeds of the first to fourth rotors are individually controlled,
wherein the first flight mode includes:
a 1-1th flight mode in which the fuselage is tilted in the x-axis direction or the fuselage moves in the y-axis direction;
a 1-2th flight mode in which the fuselage is tilted in the y-axis direction or the fuselage moves in the x-axis direction;
a 1-3th flight mode in which the fuselage rotates about the z-axis; and
a 1-4th flight mode in which the fuselage moves in the z-axis direction, and wherein the second flight mode includes:
a 2-1th flight mode in which the fuselage moves in the y-axis direction by maintaining the fuselage horizontally and tilting the first to fourth rotors about each axis parallel to the x-axis;
a 2-2th flight mode in which the fuselage moves in the y-axis direction by maintaining the fuselage horizontally and tilting the first to fourth rotors about each axis parallel to the y-axis;
a 2-3th flight mode in which the fuselage rotates about the z-axis by maintaining the fuselage horizontally and individually controlling the speeds of the first to fourth rotors;
a 2-4th flight mode in which the fuselage rotates in the z-axis direction by maintaining the fuselage horizontally and individually controlling the speeds of the first to fourth rotors;
a 2-5th flight mode in which the fuselage rotates about the x-axis by rotating the first to fourth rotors about each axis parallel to the x-axis; and a 2-6th flight mode in which the fuselage rotates about the y-axis by rotating the first to fourth rotors about each axis parallel to the y-axis, wherein the control unit is further configured to:

detect an angular difference between (i) a heading angle of the fuselage and (ii) a track angle of the drone in a trajectory, the track angle being determined from a velocity vector having a magnitude corresponding to a traveling speed of the drone in the trajectory;

compare the detected angular difference to a predetermined angular threshold value; and control the tilting angles of the rotors to reduce the angular difference so that the heading angle is adjusted only when the detected angular difference is greater than or equal to the angular threshold value.

2. The drone of claim 1, wherein the first conversion mechanism unit includes a first transmission rod configured to simultaneously transmit a driving force of the first drive motor unit to the third frame shaft and the fourth frame shaft.

3. The drone of claim 1, wherein the second conversion mechanism unit includes a second transmission rod configured to simultaneously transmit a driving force of the second drive motor unit to the first frame shaft and the second frame shaft.

4. The drone of claim 1, wherein the 2-5th flight mode includes a posture in which each rotational axis of the first to fourth rotors is parallel to the z-axis, and the fuselage rotates about the x-axis to maintain a tilted state with respect to the ground.

5. The drone of claim 1, wherein the 2-6th flight mode includes a posture in which each rotational axis of the first to fourth rotors is parallel to the z-axis, and the fuselage rotates about the y-axis to maintain a tilted state with respect to the ground.

6. A drone with a multiple DOF flight mode, comprising:

a fuselage in which a battery is mounted and a forward direction is set in an x-axis;

a plurality of rotors disposed about the fuselage in four or more, each rotational axis of which is aligned in a z-axis direction;

an x-axis tilting mechanism unit formed to tilt the plurality of rotors about an axis parallel to the x-axis;

a y-axis tilting mechanism unit formed to tilt the plurality of rotors about an axis parallel to the y-axis;

a first drive motor unit driving the y-axis tilting mechanism unit;

a second drive motor unit driving the x-axis tilting mechanism unit; and a control unit configured to implement a plurality of flight modes by controlling the first rotor, the second rotor, the third rotor, the fourth rotor, the first drive motor unit, and the second drive motor unit, wherein the plurality of flight modes include:

a first flight mode in which both the first drive motor unit and the second drive motor unit are stopped by inhibiting drive signals to the first drive motor unit and the second drive motor unit such that tilting angles of the first to fourth rotors are maintained and the speeds of the first to fourth rotors are individually controlled; and a second flight mode in which the first drive motor unit and the second drive motor unit are individually controlled and operated to change tilting angles of the first to fourth rotors, and the speeds of the first to fourth rotors are individually controlled, wherein the first flight mode includes:

a 1-1th flight mode in which the fuselage is tilted in the x-axis direction or the fuselage moves in the y-axis direction;

a 1-2th flight mode in which the fuselage is tilted in the y-axis direction or the fuselage moves in the x-axis direction;

a 1-3th flight mode in which the fuselage rotates about the z-axis; and a 1-4th flight mode in which the fuselage moves in the z-axis direction, and wherein the second flight mode includes:

a 2-1th flight mode in which the fuselage moves in the y-axis direction by maintaining the fuselage horizontally and tilting the first to fourth rotors about each axis parallel to the x-axis;

a 2-2th flight mode in which the fuselage moves in the y-axis direction by maintaining the fuselage horizontally and tilting the first to fourth rotors about each axis parallel to the y-axis;

a 2-3th flight mode in which the fuselage rotates about the z-axis by maintaining the fuselage horizontally and individually controlling the speeds of the first to fourth rotors;

a 2-4th flight mode in which the fuselage rotates in the z-axis direction by maintaining the fuselage horizontally and individually controlling the speeds of the first to fourth rotors;

a 2-5th flight mode in which the fuselage rotates about the x-axis by rotating the first to fourth rotors about each axis parallel to the x-axis; and a 2-6th flight mode in which the fuselage rotates about the y-axis by rotating the first to fourth rotors about each axis parallel to the y-axis, wherein the control unit is further configured to:

detect an angular difference between (i) a heading angle of the fuselage and (ii) a track angle of the drone in a trajectory, the track angle being determined from a velocity vector having a magnitude corresponding to a traveling speed of the drone in the trajectory;

compare the detected angular difference to a predetermined angular threshold value; and control the tilting angles of the rotors to reduce the angular difference so that the heading angle is adjusted only when the detected angular difference is greater than or equal to the angular threshold value.

7. The drone of claim 6, wherein the 2-5th flight mode includes a posture in which each rotational axis of the first to fourth rotors is parallel to the z-axis, and the fuselage rotates about the x-axis to maintain a tilted state with respect to the ground.

8. The drone of claim 6, wherein the 2-6th flight mode includes a posture in which each rotational axis of the first to fourth rotors is parallel to the z-axis, and the fuselage rotates about the y-axis to maintain a tilted state with respect to the ground.

* * * * *